United States Patent
Qin (10) Patent No.: US 11,508,162 B2
(45) Date of Patent: Nov. 22, 2022

(54) METHOD AND APPARATUS FOR DETECTING MOBILE TRAFFIC LIGHT

(71) Applicant: BEIJING BAIDU NETCOM SCIENCE AND TECHNOLOGY CO., LTD., Beijing (CN)

(72) Inventor: Huan Qin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 17/183,104

(22) Filed: Feb. 23, 2021

(65) Prior Publication Data

US 2021/0264178 A1    Aug. 26, 2021

(30) Foreign Application Priority Data

Feb. 25, 2020   (CN) .......................... 202010116857.5

(51) Int. Cl.
*G06V 20/00* (2022.01)
*G06V 20/58* (2022.01)
*G06K 9/62* (2022.01)

(52) U.S. Cl.
CPC ......... *G06V 20/584* (2022.01); *G06K 9/6215* (2013.01); *G06K 9/6259* (2013.01); *G06K 9/6265* (2013.01)

(58) Field of Classification Search
CPC ............. G06K 9/00825; G06K 9/6265; G06K 9/6259; G06K 9/6215; G06K 9/62;
(Continued)

(56) References Cited

U.S. PATENT DOCUMENTS 6,124,807 A *   9/2000   Heckeroth ............... G08G 1/07
                                                       340/908
8,576,069 B2 * 11/2013   Nadeem ........... G08G 1/096741
                                                      340/995.13
(Continued)

FOREIGN PATENT DOCUMENTS

JP       2008033851 A       2/2008
WO   WO 2019083336 A1       5/2019
WO   WO 2019100946 A1       5/2019

OTHER PUBLICATIONS

Japanese Patent Application No. 2021-026431 Office Action dated Mar. 15, 2022, 4 pages.

(Continued)

*Primary Examiner* — Amir Alavi
(74) *Attorney, Agent, or Firm* — Lathrop GPM LLP (57) ABSTRACT

The disclosure provides a method and an apparatus for detecting a mobile traffic light. The method includes: obtaining a set of positive sample images with the mobile traffic light and a set of negative sample images without the mobile traffic light; extracting current training data respectively from the set of positive sample images and the set of negative sample images based on a preset sampling ratio; detecting the mobile traffic light of each image in the current training data with a first preset detection model to determine a detection result of each image; determining current classification loss and detecting frame regression loss based on a difference between the detection result of each image and labeled data; and generating a detection model for detecting the mobile traffic light in case that the current classification loss and the current detecting frame regression loss meet a preset condition.

15 Claims, 3 Drawing Sheets performing backpropagating updates on the first preset detection model based on the current classification loss and the current detecting frame regression loss in case that the current classification loss and/or the current detecting frame regression loss do not meet the preset condition — 201 extracting new training data respectively from the set of positive sample images and the set of negative sample images based on the preset sampling ratio — 202 training the updated first preset detection model with the new training data until it is determined that both new classification loss and new detecting frame regression loss meet the preset condition — 203

(58) Field of Classification Search
CPC ...... G06K 9/6267; G06N 3/084; G06N 5/046;
G06V 20/584; G05D 1/0088; G05D
1/0246; G06F 15/18
See application file for complete search history.

(56) References Cited

U.S. PATENT DOCUMENTS

| | | | |
|---|---|---|---|
| 9,779,314 | B1 | 10/2017 | Wendel et al. |
| 10,148,917 | B2 * | 12/2018 | Hegemann .............. B60R 1/005 |
| 10,262,532 | B2 * | 4/2019 | Hyun ...................... B60R 11/04 |
| 10,380,438 | B2 * | 8/2019 | Fung ...................... G06V 20/584 |
| 10,504,481 | B2 * | 12/2019 | Kim ...................... G06F 1/3262 |
| 10,633,003 | B1 * | 4/2020 | Abundis Vargas ... B60W 50/14 |
| 11,037,005 | B2 * | 6/2021 | Li ......................... G06N 3/0454 |
| 2012/0288138 | A1 | 11/2012 | Zeng |
| 2019/0087673 | A1 | 3/2019 | Li et al. |
| 2021/0264178 | A1 * | 8/2021 | Qin ...................... G06V 20/584 |
| 2021/0276539 | A1 * | 9/2021 | Tan ...................... B60W 40/10 |
| 2021/0343143 | A1 * | 11/2021 | Korjus ..................... G06N 3/02 |
| 2022/0063108 | A1 * | 3/2022 | Viilup .................... B25J 11/008 |

OTHER PUBLICATIONS

Japanese Patent Application No. 2021-026431 English translation of Office Action dated Mar. 15, 2022, 4 pages.
European Patent Application No. 21158904.9 extended Search and Opinion dated Jul. 22, 2021, 12 pages.
Weber, M., et al. "DeepTLR: A single Deep Convolutional Network for Detection and Classification of Traffic Lights" IEEE Intelligent Vehicles Symposium (IV) Jun. 19, 2016, pp. 342-348.
Jang, C., et al. "Traffic light recognition exploiting map and localization at every stage" Expert Systems With Applications, Oxford GB, vol. 88, Jul. 12, 2017, pp. 290-304.

* cited by examiner

METHOD AND APPARATUS FOR DETECTING MOBILE TRAFFIC LIGHT

CROSS-REFERENCE TO RELATED APPLICATION

This application claims priority to Chinese Patent Application No. 202010116857.5, filed Feb. 25, 2020, which is incorporated by reference in its entirety into this disclosure.

FIELD

The disclosure relates to a field of computer technologies and autonomous driving technologies, and more particularly, it relates to a method and an apparatus for detecting a mobile traffic light, an electronic device, and a storage medium.

BACKGROUND

In autonomous driving, a traffic light is generally detected by: obtaining an approximate area of the traffic light on a map, and detecting and identifying the traffic light in a designated area. However, situations are often encountered on the road where the traffic light fails or no traffic light is installed at an intersection. Under these situations, a mobile traffic light may be placed at the intersection, and the mobile traffic light is labeled in advance on the map. However, the setting for the mobile traffic light is often not fixed, and the map needs to be updated frequently. As a result, methods for identifying mobile traffic lights are often tedious and inefficient.

SUMMARY

An aspect of embodiments of the disclosure provides a method for detecting a mobile traffic light. The method includes: obtaining a set of positive sample images with the mobile traffic light and a set of negative sample images without the mobile traffic light; extracting current training data respectively from the set of positive sample images and the set of negative sample images based on a preset sampling ratio; and training with a first preset detection model to generate a detection model. The training comprises: performing detection on the mobile traffic light of each image in the current training data with the first preset detection model to determine a detection result of each image; determining current classification loss and current detecting frame regression loss based on a difference between the detection result of each image and labeled data; and generating the detection model for detecting the mobile traffic light in case that both the current classification loss and the current detecting frame regression loss meet a preset condition.

Another aspect of embodiments of the disclosure provides an apparatus for detecting a mobile traffic light. The apparatus includes at least one processor and a memory communicatively coupled to the at least one processor. The at least one processor may be configured to obtain a set of positive sample images with the mobile traffic light and a set of negative sample images without the mobile traffic light. The at least one processor may be configured to extract current training data respectively from the set of positive sample images and the set of negative sample images based on a preset sampling ratio. The at least one processor may be configured to perform detection on the mobile traffic light of each image in the current training data with a first preset detection model to determine a detection result of each image. The at least one processor may be configured to determine current classification loss and current detecting frame regression loss based on a difference between the detection result of each image and labeled data. The at least one processor may be configured to generate a detection model for detecting the mobile traffic light in case that both the current classification loss and the current detecting frame regression loss meet a preset condition.

Another aspect of embodiments of the disclosure provide a non-transitory computer readable storage medium having computer instructions stored thereon. The computer instructions are configured to cause a computer to execute a method for detecting a mobile traffic light. The method includes: obtaining a set of positive sample images with the mobile traffic light and a set of negative sample images without the mobile traffic light; extracting current training data respectively from the set of positive sample images and the set of negative sample images based on a preset sampling ratio; and training with a first preset detection model to generate a detection model. The training comprises: performing detection on the mobile traffic light of each image in the current training data with the first preset detection model to determine a detection result of each image; determining current classification loss and current detecting frame regression loss based on a difference between the detection result of each image and labeled data; and generating the detection model for detecting the mobile traffic light in case that both the current classification loss and the current detecting frame regression loss meet a preset condition.

Other effects of the above alternative modes will be explained in the following with specific embodiments.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will be made below to a method and an apparatus for detecting a mobile traffic light, an electronic device, and a storage medium according to embodiments of the disclosure with reference to accompanying drawings.

In autonomous driving, a traffic light is generally detected by obtaining an approximate area of the traffic light on a map and identifying the traffic light in a designated area. However, it is often encountered on a road that a traffic light fails or no traffic light is installed at an intersection. In this situation, a mobile traffic light may be placed at the intersection and labeled in advance on the map. However, the setting for the mobile traffic light is often not fixed, and the map needs to be updated frequently, thereby causing that a method for identifying the mobile traffic light is tedious and inefficient.

For the problem in the related art that an existing method for detecting a mobile traffic light is tedious and inefficient, embodiments of the disclosure provide a method for detecting a mobile traffic light.

With the method for detecting the mobile traffic light according to embodiments of the disclosure, a set of positive sample images with the mobile traffic light and a set of negative sample images without the mobile traffic light are obtained. Current training data is extracted respectively from the set of positive sample images and the set of negative sample images based on a preset sampling ratio. Detection is performed on the mobile traffic light of each image in the current training data with a first preset detection model to determine a detection result of each image. Current classification loss and current detecting frame regression loss are determined based on a difference between the detection result of each image and labeled data. A detection model for detecting the mobile traffic light is generated in case that both the current classification loss and the current detecting frame regression loss meet a preset condition. In this way, the detection model for the mobile traffic light is obtained after training, and the mobile traffic light is detected by utilizing the detection model, such that an identification process is simple and has a high efficiency. Moreover, the training data is extracted based on the preset sampling ratio, which solves the problem that positive samples and negative samples are unbalanced, and enables the detection model to converge normally.

Figure 1:
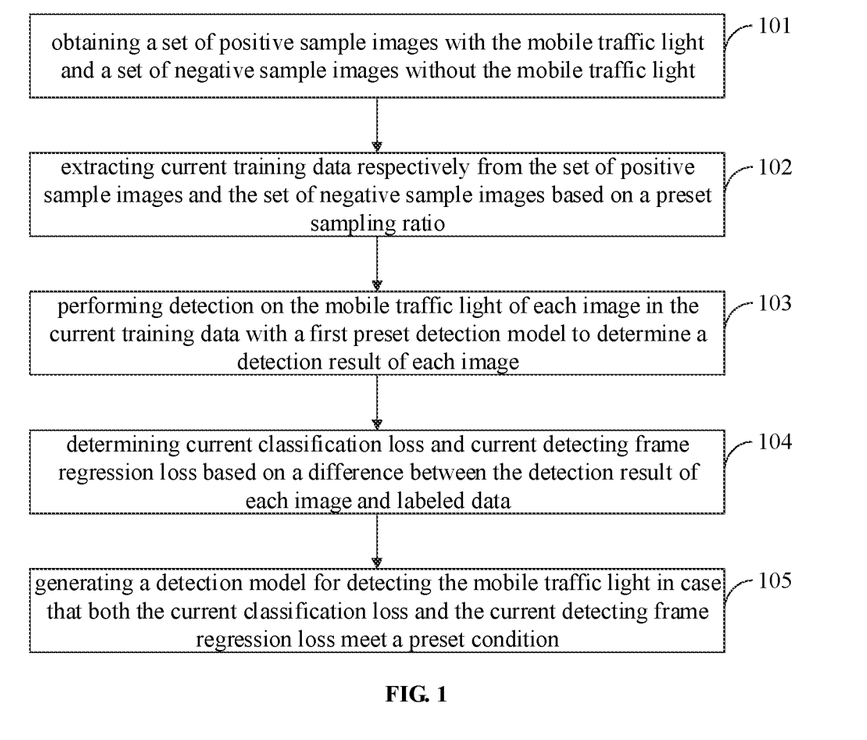
FIG. 1 is a flow chart illustrating a method for detecting a mobile traffic light according to embodiments of the disclosure.

FIG. 1 is a flow chart illustrating a method for detecting a mobile traffic light according to embodiments of the disclosure.

The method for detecting the mobile traffic light according to embodiments of the disclosure may be executed by an apparatus for detecting a mobile traffic light. The apparatus may be configured in an electronic device, to extract the training data based on the preset sampling ratio, train the detection model with the training data, and perform detection on the mobile traffic light with the detection model.

As illustrated in FIG. 1, the method for detecting the mobile traffic light includes the following steps.

In step 101, a set of positive sample images with the mobile traffic light and a set of negative sample images without the mobile traffic light are obtained.

In this embodiment, the set of positive sample images and the set of negative sample images may be obtained by collecting. The images may be collected at an intersection having the mobile traffic light to obtain the images with the mobile traffic light.

Each image in the set of positive sample images contains the mobile traffic light. No mobile traffic light is contained in each image in the set of the negative sample images.

The image in the set of negative sample images may be one that contains the misidentified mobile traffic light such as an ordinary traffic light or a signboard, may also be one that contains an intersection without a traffic light or a building. As long as an image does not contain the mobile traffic light, the image may be used as the one in the set of negative sample images.

In step 102, current training data is respectively extracted from the set of positive sample images and the set of negative sample images based on a preset sampling ratio.

In actual application, there are few scenes with the mobile traffic light, while most scenes do not include the mobile traffic light. Therefore, the positive samples and the negative samples are unbalanced during training.

A loss function employed in this embodiment includes classification loss and detecting frame regression loss. The detecting frame regression loss is configured to measure a difference between a location of a mobile traffic light predicted by the detection model and a labeled location of the mobile traffic light. When there is a high probability that training data obtained for each time does not contain the mobile traffic light, it may be caused that the loss function only calculates the classification loss for each time and does not calculate the detecting frame regression loss, thereby causing an unstable loss reduction.

In this case, positive sample images are extracted from the set of positive sample images, and negative sample images are extracted from the set of negative sample images based on the preset sampling ratio in the disclosure. The positive sample images and the negative sample images are determined as the current training data. For example, the preset sampling ratio is 1:10, 1:20, or the like.

It should be noted that, the preset sampling ratio may be set arbitrarily, as long as the training data has the positive sample images.

In step 103, detection is performed on the mobile traffic light of each image in the current training data with a first preset detection model to determine a detection result of each image.

In this embodiment, the first preset detection model may be considered as an initial detection model.

After the current training data is extracted respectively from the set of positive sample images and the set of negative sample images based on the preset sampling ratio, each image in the current training data may be input into the first preset detection model for detecting the mobile traffic light and determining the detection result of each image.

The detection result may include a location and confidence of a detection frame for the mobile traffic light. When it is detected that there is no mobile traffic light, it may be outputted that the location of the detection frame for the mobile traffic light is empty.

In step 104, current classification loss and current detecting frame regression loss are determined based on a difference between the detection result of each image and labeled data.

In this embodiment, the current training data obtained by extracting may be labeled in advance. Labeled data for the positive sample images may be a location of the mobile traffic light. The location of the mobile traffic light may be represented by a location of a detection frame containing the mobile traffic light. The location of the detection frame may be represented with a midpoint coordinate of the detection frame and a length and width of the detection frame.

The labeled data for the extracted negative sample images may be that the location of the detection frame containing the mobile traffic light is empty.

After the detection result of each image is determined, the classification loss and the detecting frame regression loss corresponding to each image may be calculated based on the detection result and the labeled data. Based on the classification loss and the detecting frame regression loss corresponding to each image, an average value of the classification loss and an average value of the detecting frame regression loss for all images in the current training data are calculated, respectively as the current classification loss and the current detecting frame regression loss.

In step 105, a detection model for detecting the mobile traffic light is generated in case that both the current classification loss and the current detecting frame regression loss meet a preset condition.

In this embodiment, the current classification loss is compared with the preset condition and the current detecting frame regression loss is compared with the preset condition. In case that both the current classification loss and the current detecting frame regression loss meet the preset condition, it may be considered that there is no need to adjust current parameters of the first preset detection model. That is, the first preset detection model may be determined to detect the mobile traffic light. Then, the mobile traffic light may be detected with the generated detection model for the mobile traffic light.

In particular, an image to be detected may be inputted into the detection model for the mobile traffic light, and the image may be detected to determine whether the image contains the mobile traffic light. When the mobile traffic light is contained, the location and confidence of the detection frame for the mobile traffic light are outputted. The confidence is configured to measure a reliability of the location of the detected mobile traffic light.

With the method for detecting the mobile traffic light according to embodiments of the disclosure, the set of positive sample images with the mobile traffic light and the set of negative sample images without the mobile traffic light are obtained. The current training data is extracted respectively from the set of positive sample images and the set of negative sample images based on the preset sampling ratio. Detection is performed on the mobile traffic light of each image in the current training data with the first preset detection model to determine the detection result of each image. The current classification loss and the current detecting frame regression loss are determined based on the difference between the detection result of each image and the labeled data. The detection model for detecting the mobile traffic light is generated in case that both the current classification loss and the current detecting frame regression loss meet the preset condition. In this way, the detection model for the mobile traffic light is obtained after training, and the mobile traffic light is detected by utilizing the detection model, such that the identification procedure is simple and has a high efficiency. Moreover, the training data is extracted based on the preset sampling ratio, which solves the problem that the positive samples and the negative samples are unbalanced and enables the detection model to converge normally.

Figure 2:
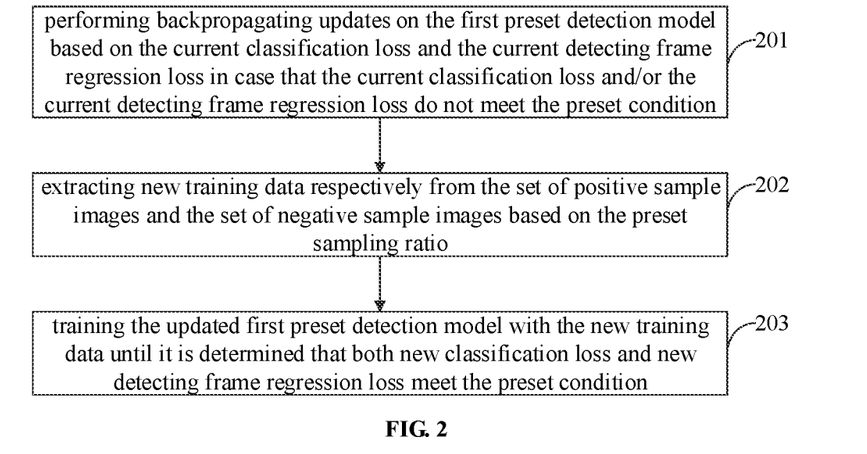
FIG. 2 is a flow chart illustrating another method for detecting a mobile traffic light according to embodiments of the disclosure.

In actual application, the first preset detection model may not meet a requirement. To solve the problem, the method illustrated in FIG. 2 may be employed. FIG. 2 is a flow chart illustrating another method for detecting a mobile traffic light according to embodiments of the disclosure.

As illustrated in FIG. 2, after determining the current classification loss and the current detecting frame regression loss, the method also includes the following steps.

In step 201, backpropagating updates are performed on the first preset detection model based on the current classification loss and the current detecting frame regression loss in case that the current classification loss and/or the current detecting frame regression loss do not meet the preset condition.

In this embodiment, the current classification loss and the current detecting frame regression loss are obtained based on the detection results of the current training data obtained by utilizing the first preset detection model. When one of the current classification loss and the current detecting frame regression loss does not meet the preset condition or when both do not meet the preset condition, it indicates that the first preset detection model does not meet the requirement yet. Thus, backpropagating updates may be performed on the first preset detection model based on the current classification loss and the current detecting frame regression loss, that is, the parameters of the first preset detection model are adjusted to obtain the updated first preset detection model.

In step 202, new training data is extracted respectively from the set of positive sample images and the set of negative sample images based on a preset sampling ratio.

In this embodiment, it is continued that the positive sample images and the negative sample images are extracted from the set of positive sample images and set of negative sample images as the new training data based on the preset sampling ratio.

It should be noted that, the preset sampling ratio here may be the same as or different from the preset sampling ratio in step 102.

In step 203, the updated first preset detection model is trained with the new training data until it is determined that both new classification loss and new detecting frame regression loss meet the preset condition.

In particular, one image in the new training data may be inputted to the updated first preset detection model. The new classification loss and the new detecting frame regression loss are determined based on the detection result of this image and the labeled data. When one of the new classification loss and the new detecting frame regression loss does not meet the preset condition or when both do not meet the preset condition, the parameters of the updated first preset detection model are adjusted. Then, it is continued that the updated first preset detection model is trained by utilizing other images in the new training data.

Alternatively, each image in the new training data may be detected, and the current classification loss and the current detecting frame regression loss may be determined based on the detection results of all images in the new training data. For example, an average value of the classification loss and an average value of the detecting frame regression loss for all images in the new training data are calculated, respectively as the current classification loss and the current detecting frame regression loss.

When training for the new training data is completed, both the classification loss and the detecting frame regression loss still do not meet the preset condition, it is continued that new training data is extracted and the updated first preset detection model is trained until both the classification loss and the detecting frame regression loss meet the preset condition.

In embodiments of the disclosure, the new training data is extracted respectively from the set of positive sample images and the set of negative sample images based on the preset sampling ratio in case that the current classification loss and/or the current detecting frame regression loss do not meet the preset condition. The detection model is trained and updated until it is determined that both the classification loss and the detecting frame regression loss meet the preset condition. Therefore, during the whole training, the training data is extracted based on the preset sampling ratio, which may ensure a normal convergence of the detection model and solve the problem that the positive samples and the negative samples are unbalanced.

Figure 3:
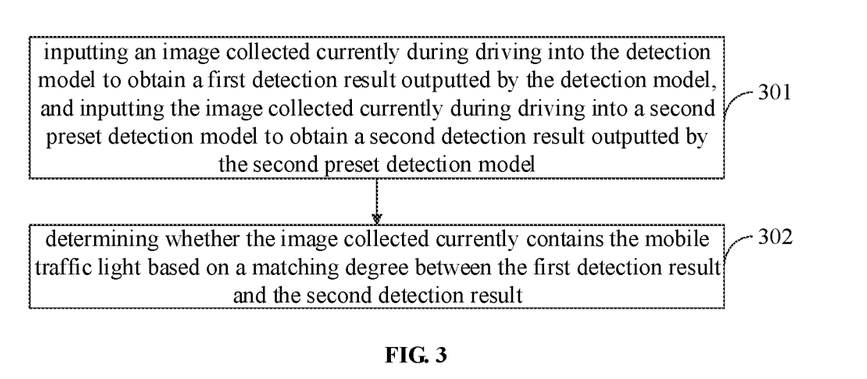
FIG. 3 is a flow chart illustrating another method for detecting a mobile traffic light according to embodiments of the disclosure.

In actual application, an image collected during driving contains a traffic light that may be the mobile traffic light or the ordinary traffic light. In order to be capable of detecting a type of the traffic light while the image contains the traffic light and to improve the driving safety, the detection model for the mobile traffic light may be combined with a model for detecting the ordinary traffic light to detect whether the collected image contains the mobile traffic light. Description may be made below with reference to FIG. 3. FIG. 3 is a flow chart illustrating another method for detecting a mobile traffic light according to embodiments of the disclosure.

As illustrated in FIG. 3, after generating the detection model for detecting the mobile traffic light, the method for detecting the mobile traffic light also includes the following steps.

In step 301, an image collected currently during driving is inputted into the detection model to obtain a first detection result outputted by the detection model, and the image collected currently during driving is inputted into a second preset detection model to obtain a second detection result outputted by the second preset detection model.

In this embodiment, the second preset detection model is the model for detecting the ordinary traffic light. An image in front of a vehicle may be collected while the vehicle is running.

In particular, the image collected during driving is respectively inputted into the detection model and the second preset detection model. The detection model detects the image and outputs the detection result, which is called as a first detection result for convenience of distinction. The second preset detection model also detects the same image and outputs a second detection result.

In step 302, it is determined whether the image collected currently contains the mobile traffic light based on a matching degree between the first detection result and the second detection result.

In this embodiment, when the first detection result is that the image does not contain the mobile traffic light, and the second detection result is that the image does not contain the ordinary traffic light, it may be considered that the image collected currently does not contain the mobile traffic light.

When the first detection result is the location and confidence of the detection frame of the mobile traffic light, the second output result is that the image does not contain the ordinary traffic light, and the matching degree between the first detection result and the second detection result is lower than a preset threshold value, it may be considered that the image collected currently contains the mobile traffic light. When the first detection result is that the image does not contain the mobile traffic light, the second output result is the location and confidence of the detection frame of the ordinary traffic light, and the matching degree between the first detection result and the second detection result is lower than the preset threshold value, it is determined that the image collected currently contains the ordinary traffic light.

Alternatively, when the first detection result is the location and confidence of the detection frame of the mobile traffic light, the second detection result is the location and confidence of the detection frame of the ordinary traffic light, and the confidence corresponding to the location of the detection frame of the mobile traffic light is greater than the confidence corresponding to the location of the detection frame of the ordinary traffic light, it may be considered that the image currently collected contains the mobile traffic light. When the confidence corresponding to the location of the detection frame of the ordinary traffic light in the second detection result is greater than the confidence corresponding to the location of the detection frame of the mobile traffic light, it may be considered that the image collected currently contains the ordinary traffic light.

With embodiments of the disclosure, after the detection model for detecting the mobile traffic light is generated, the image collected currently during driving is inputted into the detection model to obtain the first detection result outputted by the detection model, and the image collected currently during driving is inputted into the second preset detection model to obtain the second detection result outputted by the second preset detection model. It is determined whether the image collected currently contains the mobile traffic light based on the matching degree between the first detection result and the second detection result. In this way, after it is determined that the generated detection model for the mobile traffic light may be configured to detect the traffic light, the image collected during driving is respectively input into the detection model and the second preset detection model, which may identify the traffic light when the image contains the ordinary traffic light or the mobile traffic light, thereby improving the driving safety.

Figure 4:
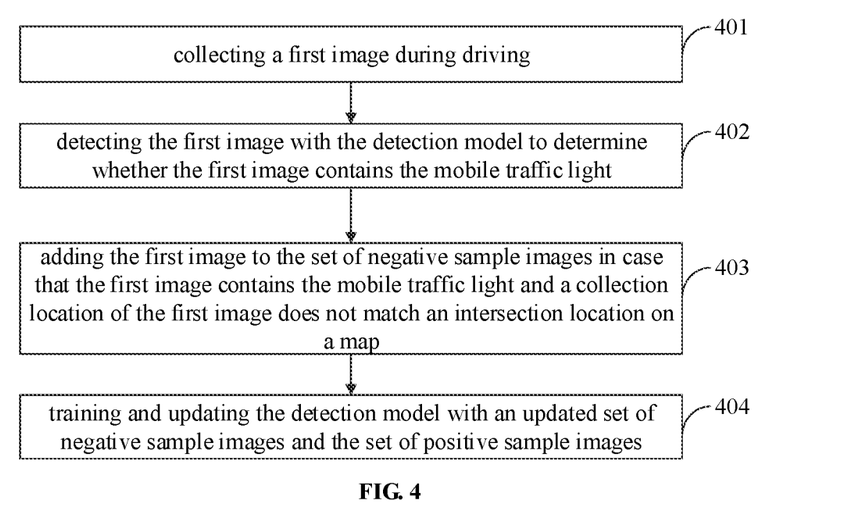
FIG. 4 is a flow chart illustrating another method for detecting a mobile traffic light according to embodiments of the disclosure.

In order to further improve a detection accuracy of the detection model for the mobile traffic light, the detection model may be updated. Description will be made below with reference to FIG. 4. FIG. 4 is a flow chart illustrating another method for detecting a mobile traffic light according to embodiments of the disclosure.

As illustrated in FIG. 4, after generating the detection model for detecting the mobile traffic light, the method for detecting the mobile traffic light also includes the following steps.

In step 401, a first image is collected during driving.

The image may be collected when the vehicle is running. For example, an image in front of a vehicle is collected, which is referred as the first picture here.

In step 402, the first image is detected with the detection model to determine whether the first image contains the mobile traffic light.

After the first image is obtained, the collected first image is input into the detection model for the mobile traffic light. The detection model is configured to extract a feature of the first image and output a detection result is. It is thus determined whether the first image contains the mobile traffic light based on the detection result of the detection model.

In step 403, the first image is added to the set of negative sample images in case that the first image contains the mobile traffic light and a collection location of the first image does not match an intersection location on a map.

In case that the first image contains the mobile traffic light and the collection location of the first image does not match the intersection location on the map, it is indicated that the detection model for the mobile traffic light misidentify the content in the first image as the mobile traffic light. The first image may be taken as the negative sample image, and added to the set of negative sample images. The intersection on the map refers to any intersection on the map.

For example, a collection location of an image is 300 meters away from the traffic light ahead, and the image after detecting contains the mobile traffic light. Because the collection location of the image is not at the intersection location, the detecting for the image is a obviously false detection, and the image may be added to the set of negative sample images.

Based on this, it is possible to add an image collected during driving to the set of negative sample images, in which the image contains the mobile traffic light after detection and the collection location of the image does not match the intersection location on the map.

In step 404, the detection model is trained and updated with an updated set of negative sample images and the set of positive sample images.

In this embodiment, the training data may be extracted respectively from the set of positive sample images and the updated set of negative sample images based on a preset sampling ratio, to train the detection model for the mobile traffic light with the extracted training data, thereby updating and optimizing the detection model.

Alternatively, the detection model for the mobile traffic light may be trained and updated by utilizing the image extracted from the set of positive sample images and the image containing the mobile traffic light and the collection location of which does not match the intersection location on the map.

In embodiments of the disclosure, after the detection model for detecting the mobile traffic light is generated, detection is performed on the first image during driving with the detection model for the mobile traffic light, to determine whether the first image contains the mobile traffic light. The first image is added to the set of negative sample images in case that the first image contains the mobile traffic light and the collection location of the first image does not match the intersection location on the map. The detection model is trained and updated with the updated set of negative sample images and the set of positive sample images. In this way, the detection accuracy of the detection model for the mobile traffic light may be improved by training and updating.

In case that there is a small number of the added images in the set of negative sample image, and a probability of extracting the added images is small when the training data is extracted, the training and updating effect may be poor. In order to further improve the detection accuracy of the detection model for the mobile traffic light, in an embodiment of the disclosure, it may be firstly determined that the number of the added images reaches a certain number before the detection model for the mobile traffic light is trained and updated with the updated set of negative sample images and the set of positive sample images.

In particular, after it is determined that a ratio of the number of the added images contained in the updated set of negative sample images to a total number of images in the updated set of negative sample images is greater than a threshold, the detection model for the mobile traffic light is trained and updated based on the updated set of negative sample images and the set of positive sample images.

For example, the threshold is one third. In other words, when the ratio of the number of the added images contained in the updated set of negative sample images to the total number of images in the updated set of negative sample images is greater than one third, the updated set of negative sample images and the set of positive sample images are utilized to update the detection model for the mobile traffic light.

In the embodiment of the disclosure, before the detection model for the mobile traffic light is trained and updated with the updated set of negative sample images and the set of positive sample images, it is determined whether the ratio of the number of the added images contained in the updated set of negative sample images to the total number of images in the updated set of negative sample images is greater than the threshold. In this way, the training and updating effect may be improved, and the accuracy of the detection model for the mobile traffic light is also improved.

Figure 5:
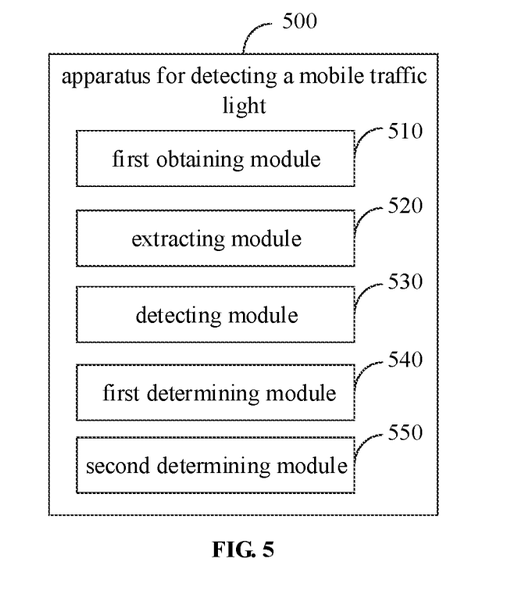
FIG. 5 is a block diagram illustrating an apparatus for detecting a mobile traffic light according to embodiments of the disclosure.

To achieve the above embodiments, embodiments of the disclosure also provide an apparatus for detecting a mobile traffic light. FIG. 5 is a block diagram illustrating an apparatus for detecting a mobile traffic light according to embodiments of the disclosure.

As illustrated in FIG. 5, the apparatus 500 for detecting the mobile traffic light includes a first obtaining module 510, an extracting module 520, a detecting module 530, a first determining module 540, and a second determining module 550.

The first obtaining module 510 is configured to obtain a set of positive sample images with the mobile traffic light and a set of negative sample images without the mobile traffic light. The extracting module 520 is configured to extract current training data respectively from the set of positive sample images and the set of negative sample images based on a preset sampling ratio. The detecting module 530 is configured to perform detection on the mobile traffic light of each image in the current training data with a first preset detection model to determine a detection result of each image. The first determining module 540 is configured to determine current classification loss and current detecting frame regression loss based on a difference between the detection result of each image and labeled data. The second determining module 550 is configured to generate a detection model for detecting the mobile traffic light in case that both the current classification loss and the current detecting frame regression loss meet a preset condition.

As a possible implementation of embodiments of the disclosure, the apparatus may also include a first updating module and a training module.

The first updating module is configured to perform back-propagating and updates on the first preset detection model based on the current classification loss and the current detecting frame regression loss in case that the current classification loss and/or the current detecting frame regression loss do not meet the preset condition. The extracting module is configured to extract new training data respectively from the set of positive sample images and the set of negative sample images based on a preset sampling ratio. The training module is configured to train the updated detection model with the new training data until it is determined that both new classification loss and new detecting frame regression loss meet the preset condition.

As a possible implementation of embodiments of the disclosure, the apparatus may also include a second obtaining module and a third determining module.

The second obtaining module is configured to input an image collected currently during driving into the detection model to obtain a first detection result outputted by the detection model, and to input the image collected currently during driving into a second preset detection model to obtain a second detection result outputted by the second preset detection model. The third determining module is configured to determine whether the image collected currently contains the mobile traffic light based on a matching degree between the first detection result and the second detection result.

As a possible implementation of embodiments of the disclosure, the apparatus may also include a collecting module, a fourth determining module, a third obtaining module, and a second updating module.

The collecting module is configured to collect a first image during driving. The fourth determining module is configured to detect the first image with the detection model to determine whether the first image contains the mobile traffic light. The third obtaining module is configured to add the first image to the set of negative sample images in case that the first image contains the mobile traffic light and a collection location of the first image does not match an intersection location on a map. The second updating module is configured to train and update the detection model with an updated set of negative sample images and the set of positive sample images.

As a possible implementation of embodiments of the disclosure, the apparatus may also include a five determining module.

The five determining module is configured to determine whether a ratio of a number of the added images contained in the updated set of negative sample images to a total number of images in the updated set of negative sample images is greater than a threshold.

It should be noted that, description for the above embodiments of the method for detecting the mobile traffic light is also applicable to the apparatus for detecting the mobile traffic light in this embodiment, which is not elaborated here.

With the apparatus for detecting the mobile traffic light according to embodiments of the disclosure, the set of positive sample images with the mobile traffic light and the set of negative sample images without the mobile traffic light are obtained. The current training data is extracted respectively from the set of positive sample images and the set of negative sample images based on the preset sampling ratio. Detection is performed on the mobile traffic light of each image in the current training data with the first preset detection model to determine the detection result of each image. The current classification loss and the current detecting frame regression loss are determined based on the difference between the detection result of each image and the labeled data. The detection model for detecting the mobile traffic light is generated in case that both the current classification loss and the current detecting frame regression loss meet the first preset condition. In this way, the detection model for the mobile traffic light is obtained after training, and the mobile traffic light is detected by utilizing the detection model, such that the identification procedure is simple and has a high efficiency. Moreover, the training data is extracted based on a preset sampling ratio, which solves the problem that the positive samples and the negative samples are unbalanced, and enables the detection model to converge normally.

According to embodiments of the disclosure, the disclosure also provides an electronic device and a readable storage medium.

Figure 6:
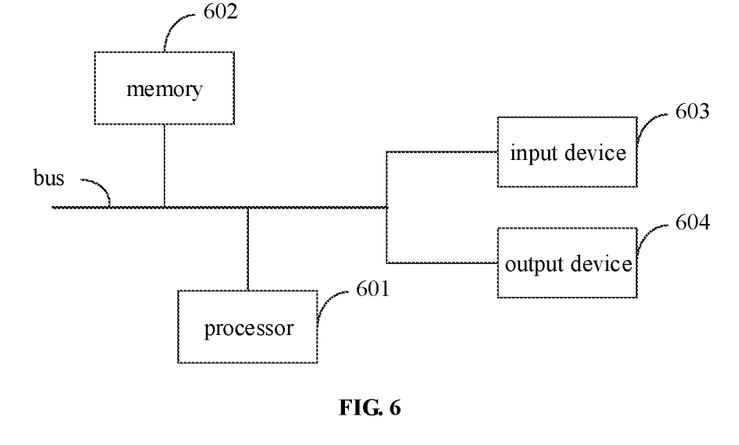
FIG. 6 is a block diagram illustrating an electronic device capable of implementing a method for detecting a mobile traffic light according to embodiments of the disclosure.

As illustrated in FIG. 6, FIG. 6 is a block diagram illustrating an electronic device capable of implementing a method for detecting a mobile traffic light according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the electronic device includes: one or more processors 601, a memory 602, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the disclosure. The memory is configured to store instructions executable by at least one processor, to enable the at least one processor to execute the method for detecting the mobile traffic light provided by the disclosure. The non-transitory computer readable storage medium provided by the disclosure is configured to store computer instructions. The computer instructions are configured to enable a computer to execute the method for detecting the mobile traffic light provided by the disclosure.

As the non-transitory computer readable storage medium, the memory 602 may be configured to store non-transitory software programs, non-transitory computer executable programs and modules, such as program instructions/module (such as the first obtaining module 510, the extracting module 520, the detecting module 530, the first determining module 540, and the second determining module 550 illustrated in FIG. 5) corresponding to the method for detecting the mobile traffic light according to embodiments of the disclosure. The processor 601 is configured to execute various functional applications and data processing of the server by operating non-transitory software programs, instructions and modules stored in the memory 602, that is, implements the method for detecting the mobile traffic light according to the above method embodiments.

The memory 602 may include a storage program region and a storage data region. The storage program region may store an application required by an operating system and at least one function. The storage data region may store data created according to predicted usage of the electronic device based on the semantic representation. In addition, the memory 602 may include a high-speed random access memory, and may also include a non-transitory memory, such as at least one disk memory device, a flash memory device, or other non-transitory solid-state memory device. In some embodiments, the memory 602 may optionally include memories remotely located to the processor 601, and these remote memories may be connected to the electronic device via a network. Examples of the above network include, but are not limited to, an Internet, an intranet, a local area network, a mobile communication network and combinations thereof.

The electronic device capable of implementing the method for detecting the mobile traffic light may also include: an input device 603 and an output device 604. The processor 601, the memory 602, the input device 603, and the output device 604 may be connected via a bus or in other means. In FIG. 6, the bus is taken as an example.

The input device 603 may receive inputted digital or character information, and generate key signal input related to user setting and function control of the electronic device capable of implementing the method for detecting the mobile traffic light, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the disclosure, the detection model for the mobile traffic light is obtained after training, and the mobile traffic light is detected by utilizing the detection model, such that the identification procedure is simple and has a high efficiency. Moreover, the training data is extracted based on a preset sampling ratio, which solves the problem that the positive samples and the negative samples are unbalanced, and enables the detection model to converge normally.

In the description of the disclosure, terms such as "first" and "second" are used for purposes of description and are not understood to indicate or imply relative importance or implicitly indicate the number of indicated technical features. Therefore, the features defined with "first" and "second" may explicitly or implicitly include at least one of the indicated technical features. In the description of the disclosure, the term "multiple" means at least two, such as two, three, etc., unless otherwise specifically defined.

Although embodiments of the disclosure have been shown and described above. It should be understood that, the above embodiments are exemplary, and may not be construed to limit the disclosure. The skilled in the art may make changes, modifications, substitutions and variations in the above embodiments within the scope of the disclosure.

What is claimed is:

1. A method for detecting a mobile traffic light, comprising:
obtaining a set of positive sample images with the mobile traffic light and a set of negative sample images without the mobile traffic light;
extracting current training data respectively from the set of positive sample images and the set of negative sample images based on a preset sampling ratio; and
training with a first preset detection model to generate a detection model, which comprises:
performing detection on the mobile traffic light of each image in the current training data with the first preset detection model to determine a detection result of each image;
determining current classification loss and current detecting frame regression loss based on a difference between the detection result of each image and labeled data; and generating the detection model for detecting the mobile traffic light in case that both the current classification loss and the current detecting frame regression loss meet a preset condition.

2. The method of claim 1, after determining the current classification loss and the current detecting frame regression loss, further comprising:
performing backpropagating updates on the first preset detection model based on the current classification loss and the current detecting frame regression loss in case that the current classification loss and/or the current detecting frame regression loss do not meet the preset condition;
extracting new training data respectively from the set of positive sample images and the set of negative sample images based on a preset sampling ratio; and
training the updated first preset detection model with the new training data until it is determined that both new classification loss and new detecting frame regression loss meet the preset condition.

3. The method of claim 1, after generating the detection model for detecting the mobile traffic light, further comprising:
inputting an image collected currently during driving into the detection model to obtain a first detection result outputted by the detection model, and inputting the image collected currently during driving into a second preset detection model to obtain a second detection result outputted by the second preset detection model; and
determining whether the image collected currently contains the mobile traffic light based on a matching degree between the first detection result and the second detection result.

4. The method of claim 1, after generating the detection model for detecting the mobile traffic light, further comprising:
collecting a first image during driving;
detecting the first image with the detection model to determine whether the first image contains the mobile traffic light;
adding the first image to the set of negative sample images in case that the first image contains the mobile traffic light and a collection location of the first image does not match an intersection location on a map; and
training and updating the detection model with an updated set of negative sample images and the set of positive sample images.

5. The method of claim 4, before training and updating the detection model with the updated set of negative sample images and the set of positive sample images, further comprising:
determining whether a ratio of a number of the added images contained in the updated set of negative sample images to a total number of images in the updated set of negative sample images is greater than a threshold.

6. An apparatus for detecting a mobile traffic light, comprising:
at least one processor; and
a memory communicatively coupled to the at least one processor,
wherein the at least one processor is configured to:
obtain a set of positive sample images with the mobile traffic light and a set of negative sample images without the mobile traffic light;
extract current training data respectively from the set of positive sample images and the set of negative sample images based on a preset sampling ratio;
perform detection on the mobile traffic light of each image in the current training data with a first preset detection model to determine a detection result of each image;
determine current classification loss and current detecting frame regression loss based on a difference between the detection result of each image and labeled data; and
generating a detection model for detecting the mobile traffic light in case that both the current classification loss and the current detecting frame regression loss meet a preset condition.

7. The apparatus of claim 6, wherein the at least one processor is further configured to:
perform backpropagating updates on the first preset detection model based on the current classification loss and the current detecting frame regression loss in case that the current classification loss and/or the current detecting frame regression loss do not meet the preset condition;
extract new training data respectively from the set of positive sample images and the set of negative sample images based on a preset sampling ratio; and
train the updated first preset detection model with the new training data until it is determined that both new classification loss and new detecting frame regression loss meet the preset condition.

8. The apparatus of claim 6, wherein the at least one processor is further configured to:
input an image collected currently during driving into the detection model to obtain a first detection result outputted by the detection model, and to input the image collected currently during driving into a second preset detection model to obtain a second detection result outputted by the second preset detection model; and
determine whether the image collected currently contains the mobile traffic light based on a matching degree between the first detection result and the second detection result.

9. The apparatus of claim 6, wherein the at least one processor is further configured to:
collect a first image during driving;
detect the first image with the detection model to determine whether the first image contains the mobile traffic light;
add the first image to the set of negative sample images in case that the first image contains the mobile traffic light and a collection location of the first image does not match an intersection location on a map; and
train and update the detection model with an updated set of negative sample images and the set of positive sample images.

10. The apparatus of claim 9, wherein the at least one processor is further configured to:
determine whether a ratio of a number of the added images contained in the updated set of negative sample images to a total number of images in the updated set of negative sample images is greater than a threshold.

11. A non-transitory computer readable storage medium having computer instructions stored thereon, wherein the computer instructions are configured to cause a computer to execute a method for detecting a mobile traffic light, the method comprising:
obtaining a set of positive sample images with the mobile traffic light and a set of negative sample images without the mobile traffic light;

extracting current training data respectively from the set of positive sample images and the set of negative sample images based on a preset sampling ratio; and training with a first preset detection model to generate a detection model, which comprises:

performing detection on the mobile traffic light of each image in the current training data with the first preset detection model to determine a first detection result of each image;

determining current classification loss and current detecting frame regression loss based on a difference between the first detection result of each image and labeled data; and generating the detection model for detecting the mobile traffic light in case that both the current classification loss and the current detecting frame regression loss meet a preset condition.

12. The storage medium of claim 11, after determining the current classification loss and the current detecting frame regression loss, further comprising:

performing backpropagating updates on the first preset detection model based on the current classification loss and the current detecting frame regression loss in case that the current classification loss and/or the current detecting frame regression loss do not meet the preset condition;

extracting new training data respectively from the set of positive sample images and the set of negative sample images based on a preset sampling ratio; and training the updated first preset detection model with the new training data until it is determined that both new classification loss and new detecting frame regression loss meet the preset condition.

13. The storage medium of claim 11, after generating the detection model for detecting the mobile traffic light, further comprising:

inputting an image collected currently during driving into the detection model to obtain a first detection result outputted by the detection model, and inputting the image collected currently during driving into a second preset detection model to obtain a second detection result outputted by the second preset detection model; and determining whether the image collected currently contains the mobile traffic light based on a matching degree between the first detection result and the second detection result.

14. The storage medium of claim 11, after generating the detection model for detecting the mobile traffic light, further comprising:

collecting a first image during driving;

detecting the first image with the detection model to determine whether the first image contains the mobile traffic light;

adding the first image to the set of negative sample images in case that the first image contains the mobile traffic light and a collection location of the first image does not match an intersection location on a map; and training and updating the detection model with an updated set of negative sample images and the set of positive sample images.

15. The storage medium of claim 14, before training and updating the detection model with the updated set of negative sample images and the set of positive sample images, further comprising:

determining whether a ratio of a number of the added images contained in the updated set of negative sample images to a total number of images in the updated set of negative sample images is greater than a threshold.

* * * * *